July 30, 1929.  G. B. COLEMAN  1,722,839

CLUTCH

Filed Jan. 21, 1925

Inventor
GEORGE B. COLEMAN,

Attorney

Patented July 30, 1929.

1,722,839

UNITED STATES PATENT OFFICE.

GEORGE B. COLEMAN, OF DAYTON, OHIO, ASSIGNOR TO COLEMAN AUTOMATIC TRANSMISSION COMPANY, OF SAN FRANCISCO, CALIFORNIA, A CORPORATION OF CALIFORNIA.

CLUTCH.

Application filed January 21, 1925. Serial No. 3,793.

The object of the invention is, primarily, to provide a construction in which the driving and driven members are so mounted and operatively related that a single actuating means may be employed for simple forward and rearward movement to operatively engage them for the forward or reverse movement of the load; to provide a construction in which relative movement of the driving and driven members is permitted for engagement to permit the driven member to gradually acquire the speed of the driving member, so that the load may be started without shock and without excessive strain on the motor or other prime mover; to provide a device particularly adapted for the connection of the varying speed prime mover to its load, such as a series wound electric motor in which the starting torque is high and the speed relatively low, thus providing for the gradual movement of the load and the successful attainment of the operating speed of the prime mover; and to provide a clutch construction in which the operating parts are of simple design but capable of effectively functioning, so that practically no attention is required after installation which makes it possible to enclose the elements in a casing in which they may be immersed in a bath of oil.

Figure 1:
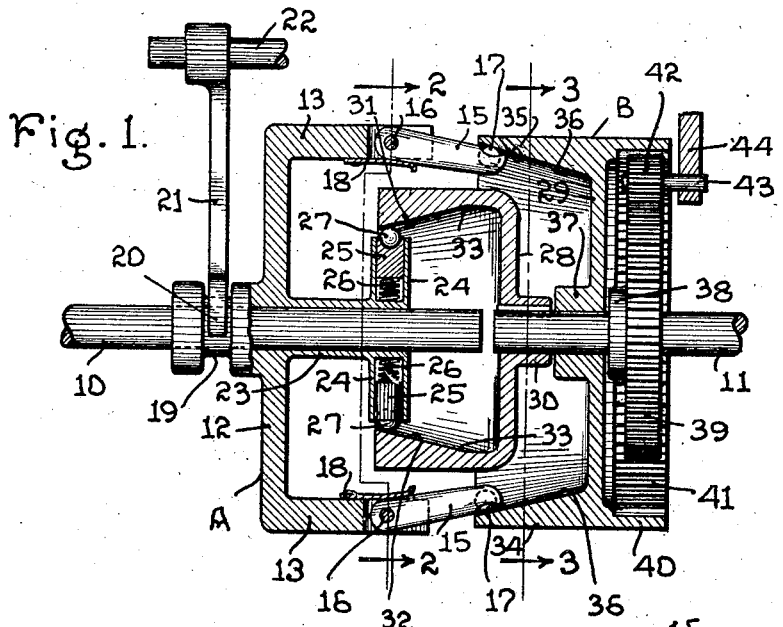

With these objects in view, the invention consists in a construction and combination of parts of which a preferred embodiment is illustrated in the accompanying drawings, wherein:

Figure 1 is a central vertical sectional view through the invention.

Figure 3:
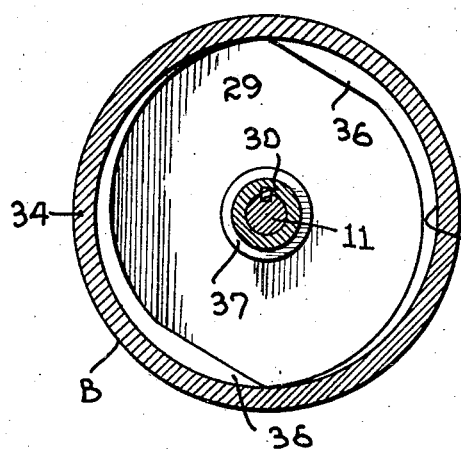
Figure 2:
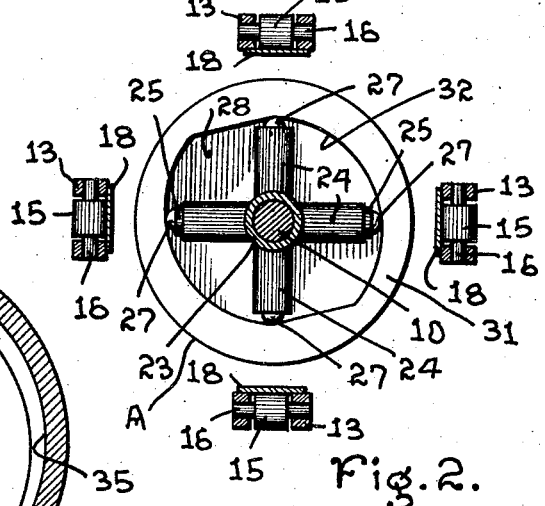

Figures 2 and 3 are respectively vertical sectional views on the planes indicated by the lines 2—2 and 3—3 of Figure 1.

The driving and driven shafts 10 and 11 respectively carry the driver A and the driver B of which the former is in the form of a spider having its radial arms 12 formed with axial extensions 13 at the extremities of which are carried the swinging arms 15 pivotally connected with the extensions, as at 16. At the extremities of the arms are carried bearing elements 17 in the form of balls seated in the spherical pockets in the arms. To provide a normal outward swinging tendency for the arms, leaf springs 18 carried by the extensions 13 bear upon the inner sides of the arms.

The hub of the spider which is extended in opposite directions from the arms 12 is grooved, as at 19, forwardly of the arms to provide a working slot with which the fork 20 of the shifter arm 21 may engage, the shifter arm being mounted on an axially movable shaft 22 for forward and rearward movement by any desired operating means. Obviously, movement of the shifter arm will impart axial movement to the spider which is keyed to the driving shaft 10 for axial movement on the latter but precluded from relative angular movement therewith.

The rearwardly projecting portion 23 of the hub is formed with a second spider of which the radial arms 24 are of tubular form for the telescopic reception of the slide bars 25 which are impelled radially outward by compression springs 26 seated in the arms 24. The outer extremities of the slide bars carry bearing balls 27 mounted in globular seats therein.

The bearing balls 27, in one position of the driver A, operatively engage the element 28 of the driven B, while in another position of the driver A, the bearing balls 17 operatively engage the element 29 of the driven B. The element 28 is in the form of a flanged disk of which the hub 30 is rigidly secured to the driven shaft 11 and the flange 31 adjacent the free edge is formed with diametrically opposite cam surfaces 32 of which the rises and falls both merge into the face 33 which, adjacent the body of the disk 28, has a cylindrical surface concentric with the axis of the driven shaft 11.

The element 29 of the driven B is similar to the element 28 with the exception that the flange 34 is formed with a conical surface 35 concentric with and adjacent the free edge and the cam surfaces 36 adjacent the body of the disk constituting the element 29, these cam surfaces 36 merging into the conical surface 35, as in the element 28. The hub 37 of the element 29 is bored to receive the driven shaft 11 and the driven element floats upon the shaft, axial movement being prevented by abutting engagement of the hub 30 with the element 28 on the one end and corresponding abutting engagement on the other end with the hub 38 of the reverse gear 39 which is secured to the driven shaft and precluded both from axial and angular movement thereon. The element 29 of the driven B is formed with a rearwardly directed flange 40 on the edge of which and on the inner face are formed the annular gear teeth 41 which mesh with a pinion 42 rotatably mounted on the stub shaft 43 carried by a bracket 44 fixed to some stationary part as, for example, the casing in which the operating parts are housed. The pinion 42 also meshes with the reverse gear 39.

With the driving shaft 10 moving in one direction and the bearing roll 17 engaged with the cam surfaces of the element 29, that element moves in the same direction as the driving shaft, thus imparting rotary movement to the pinion 42 in the same direction, but this pinion meshing with the reverse gear 39, angular movement of that is in the opposite direction to the driving shaft and the driver A, and the gear being secured to the driven shaft, reverse movement of that with respect to the driving shaft is obtained. When the bearing rolls 27 are engaged with the cam surfaces of the element 28, the driving and driven shafts move in the same direction, there being a direct connection between the two due to the engagement of the driver A with the element 28 of the driven B.

Operative connection between the driver A and either of the elements of the driven B is accomplished when either the bearing rolls 17 or 27 engage the cam surfaces on the elements 29 or 28. The bearing rolls will follow the cam surfaces and be successively moved toward and away from their axis. When speed is attained, the centrifugal force, due to the rotation of the driver A, will resist the normal radial inward movement that would be imparted to the arms 15 or the slide bars 25 and, consequently, the driven B will follow the driver A. When the driver A is in such a position that the bearing balls 17 and 27 will respectively engage the circular surfaces 33 and 35 of the elements 28 and 29, no movement will be imparted to either of the elements of the driven since the bearing balls may roll around said cylindrical surface. Upon the movement of the shifter arm 21 to position the driver A at a point on the shaft, the bearing balls will engage said cylindrical surfaces and accomplish a neutral setting of the clutch.

The invention having been described, what is claimed as new and useful is:

1. A clutch comprising driver and driven of which one embodies a plurality of sets of elements actuated by centrifugal force and the other includes cooperating complemental elements respectively engageable each by one of said centrifugal elements, said sets of centrifugal elements being relatively fixed for synchronous axial bodily movement and said cooperating elements being similarly relatively fixed but precluded from axial movement, one of said complemental elements having a direct connection with the driven to effect forward movement of the same and the other a connection to effect reverse movement of the driven, and means for imparting axial movement to the sets of centrifugal elements to alternately effect operative engagement between each and its corresponding complemental element.

2. A clutch comprising driver and driven of which one embodies a plurality of sets of elements actuated by centrifugal force and the other includes a plurality of complemental elements provided with cam surfaces and adjacent circular surfaces concentric with the axis of rotation, the cam and circular surfaces of each complemental element being respectively reversed, said sets of centrifugal elements being relatively fixed for synchronous axial bodily movement and said cooperating elements being similarly relatively fixed but precluded from axial movement, one of said complemental elements having a forward driving connection with the driven and the other a reverse connection with the same, the cam and circular surface of each complemental element being alternately engageable with its set of centrifugal elements, and means for imparting axial movement to the sets of centrifugal elements.

In testimony whereof he affixes his signature.

GEORGE B. COLEMAN.